(No Model.)  6 Sheets—Sheet 1.
C. E. MALLETT.
BALE COVERING.
No. 518,820.  Patented Apr. 24, 1894.
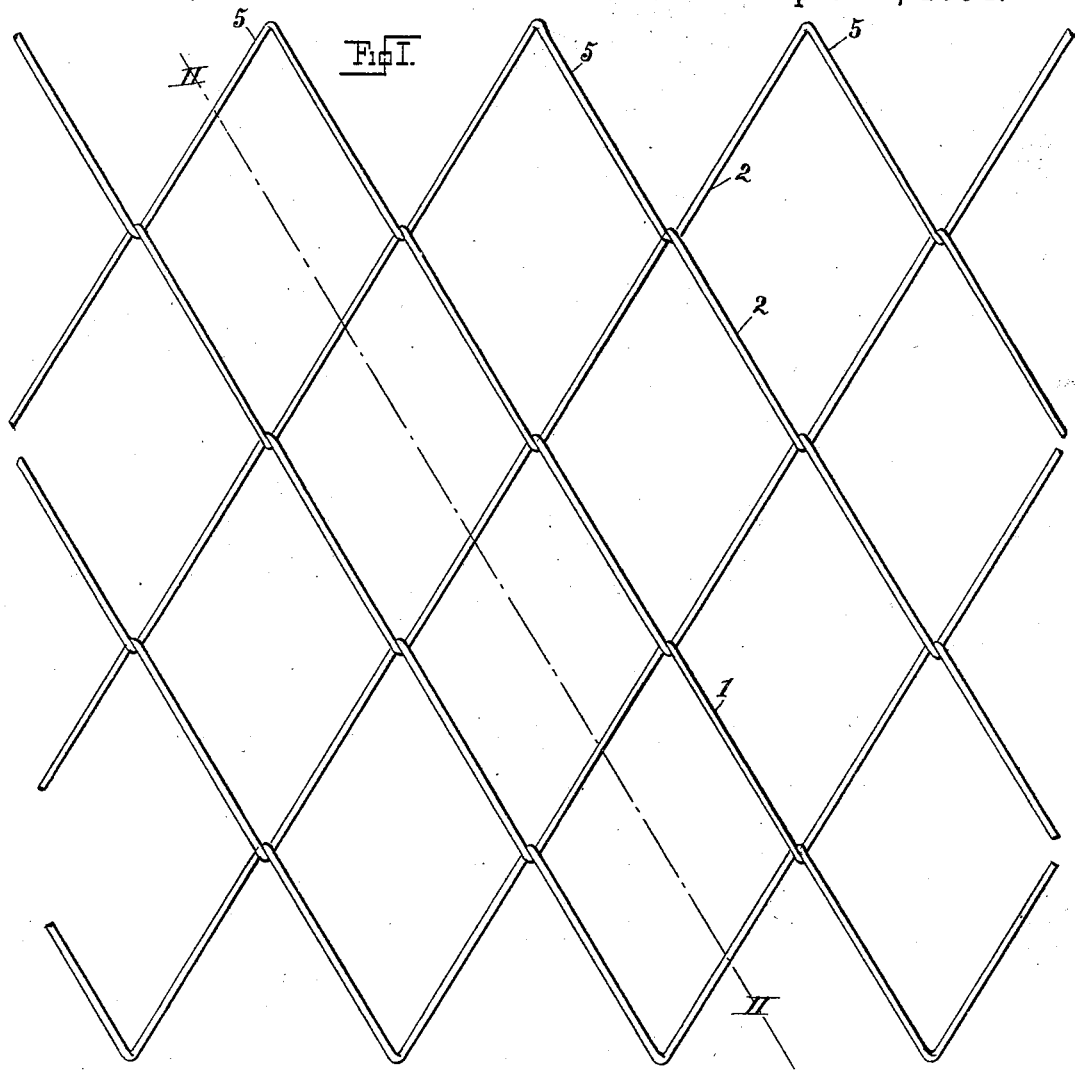
Fig. I.
Fig. II.
Witnesses
Geo. W. Naylor Jr.
M. V. Bidgood
Inventor
Charles E. Mallett
By Knight Bros
Attys.

(No Model.)  6 Sheets—Sheet 2.
C. E. MALLETT.
BALE COVERING.
No. 518,820. Patented Apr. 24, 1894.
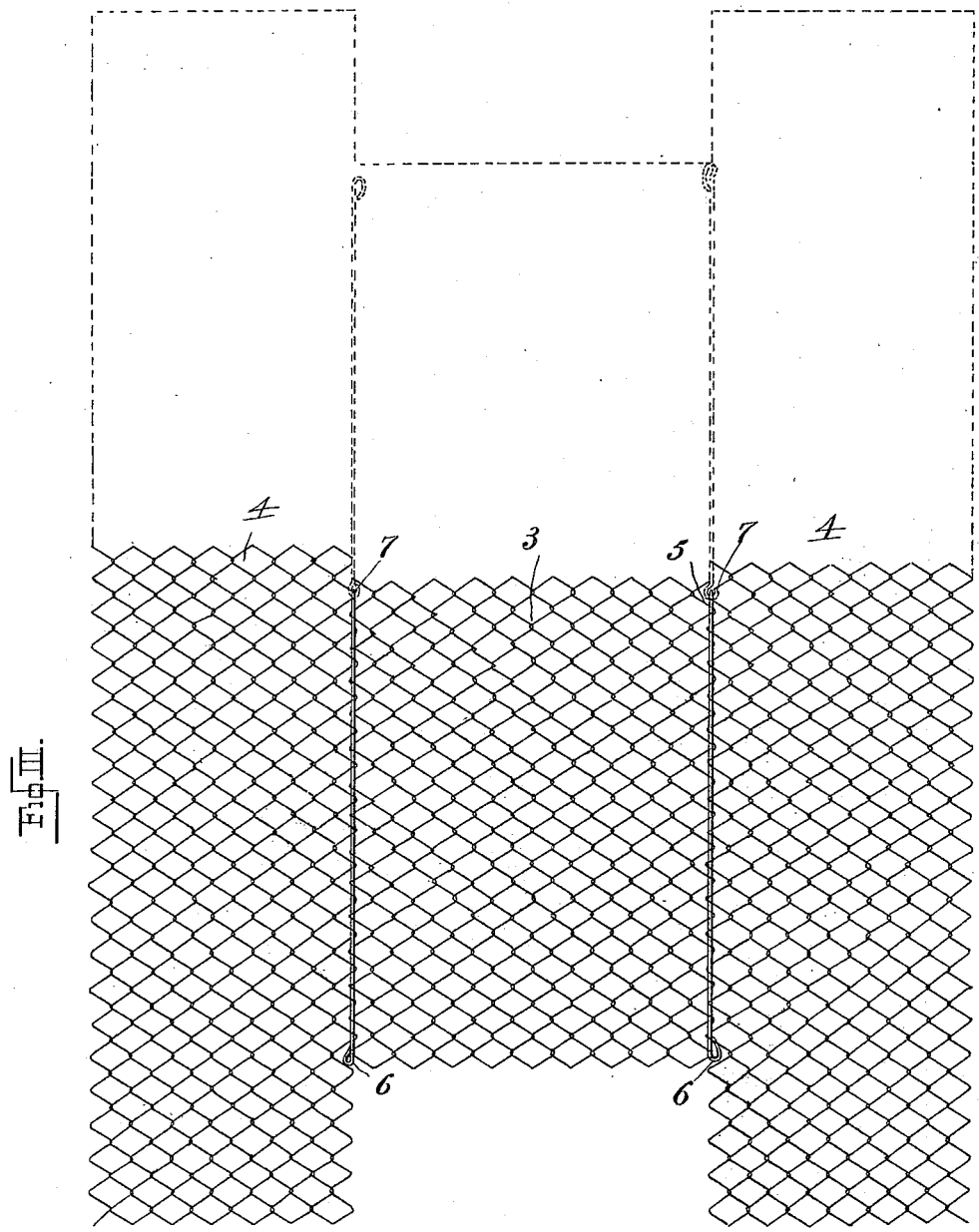
Witnesses
Geo. W. Naylor Jr.
M. V. Bidgood
Inventor
Charles E. Mallett
By Knight Bros.
Attys.

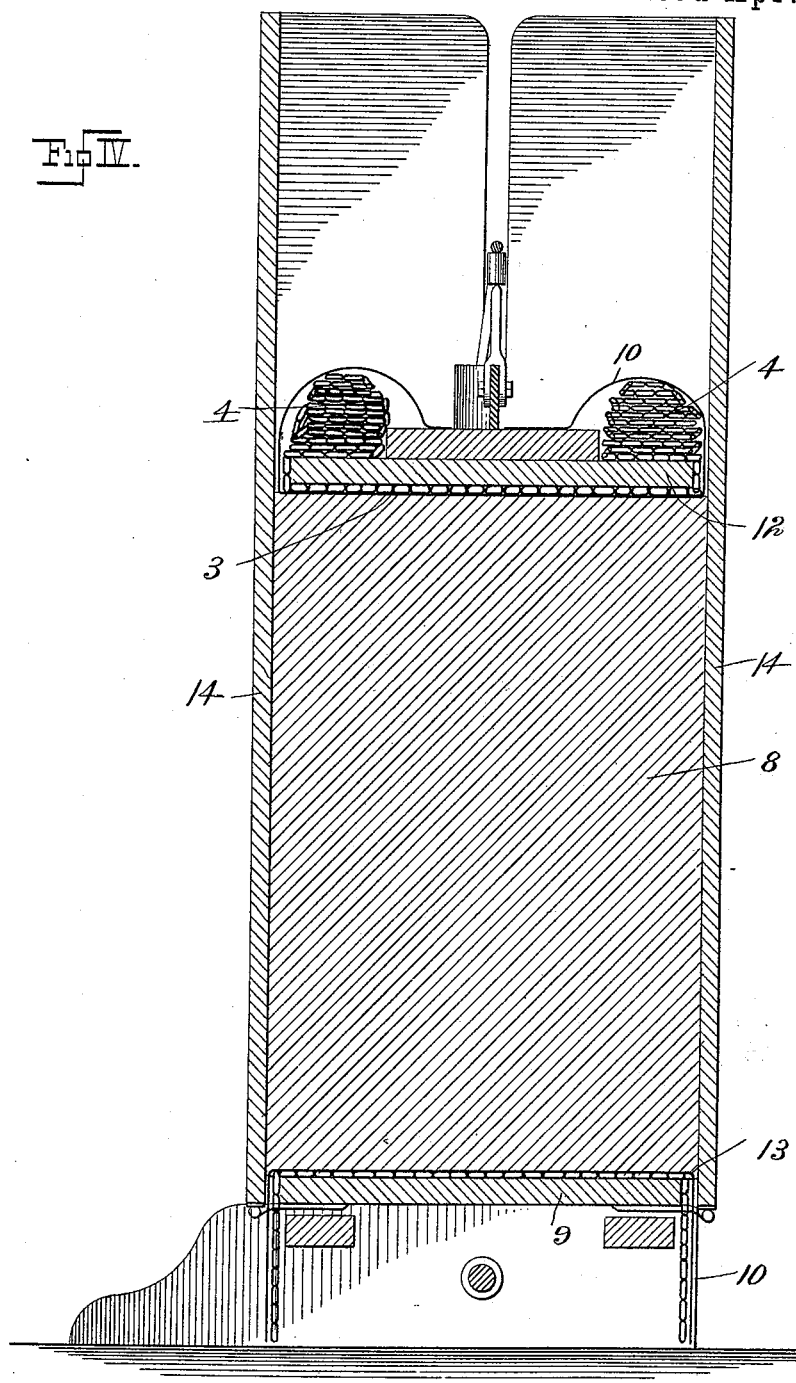

(No Model.) 6 Sheets—Sheet 4.
C. E. MALLETT.
BALE COVERING.
No. 518,820. Patented Apr. 24, 1894.
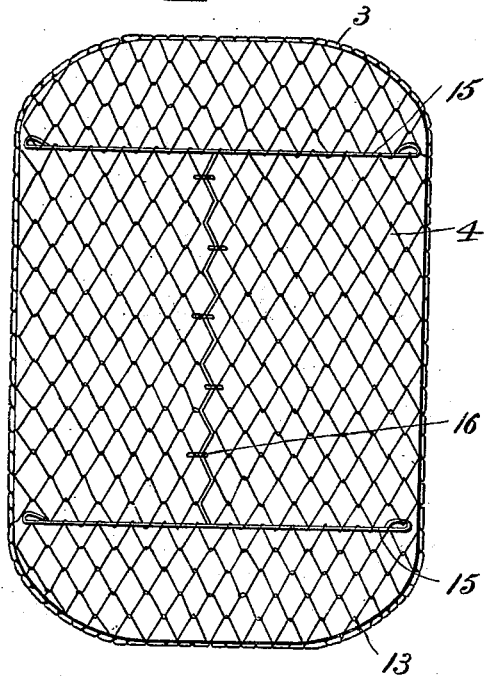
Fig. V.
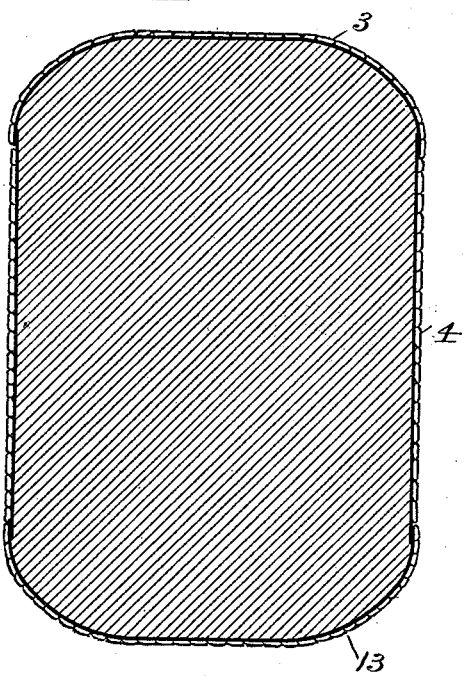
Fig. VI.
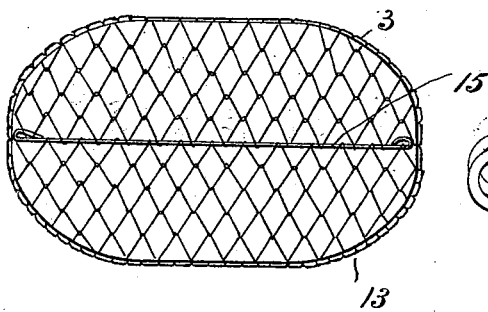
Fig. VIII.
Fig. IX.
Witnesses
Geo. W. Naylor
M. V. Bidgood
Inventor
Charles E. Mallett
By Knight Bros.
Attys.

(No Model.) 6 Sheets—Sheet 5.
C. E. MALLETT.
BALE COVERING.
No. 518,820. Patented Apr. 24, 1894.
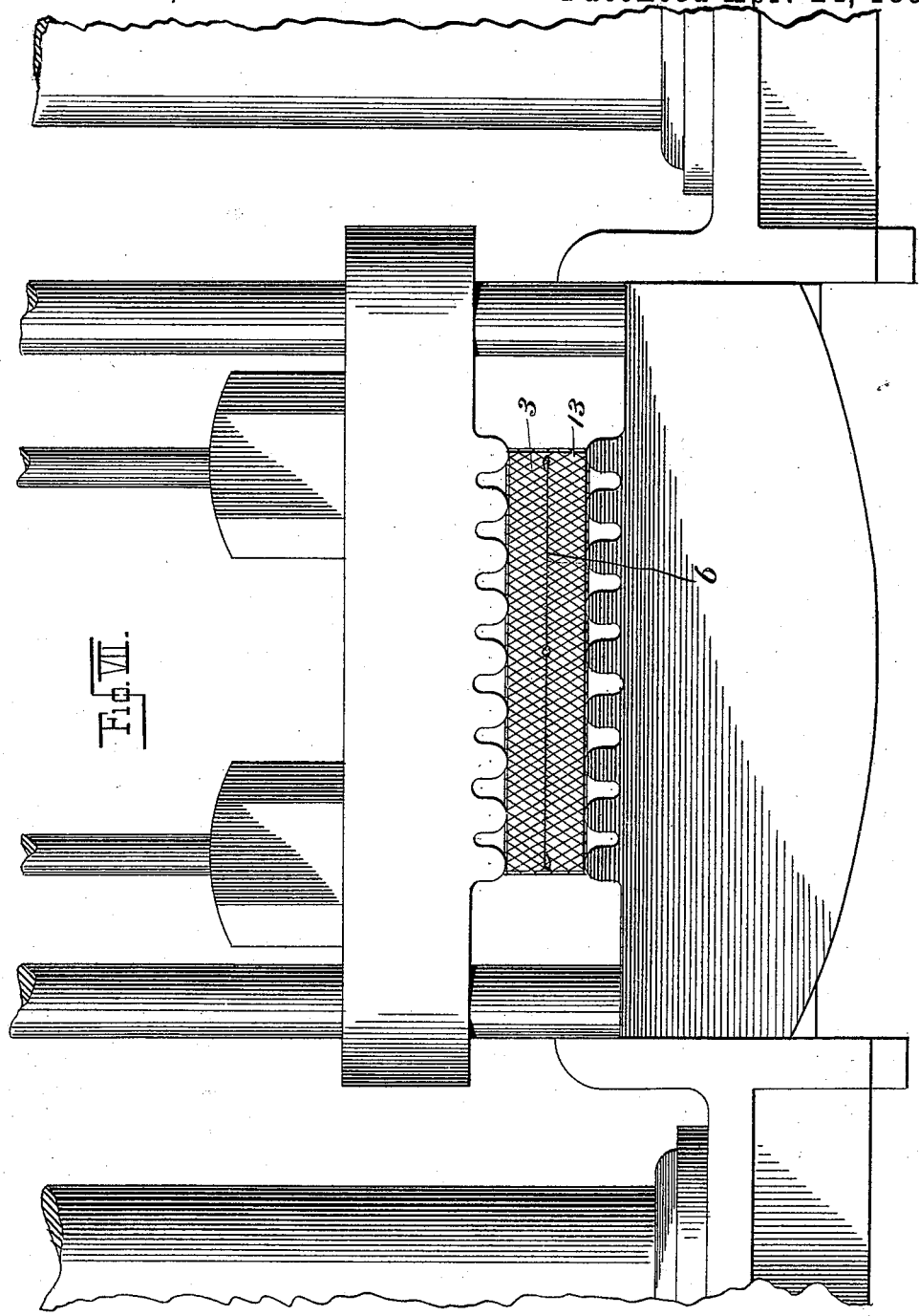
Fig. VII.
Witnesses
Geo. W. Nayburgh
M. V. Bidgood
Inventor
Charles E. Mallett
By Strug & Bro
Attys.

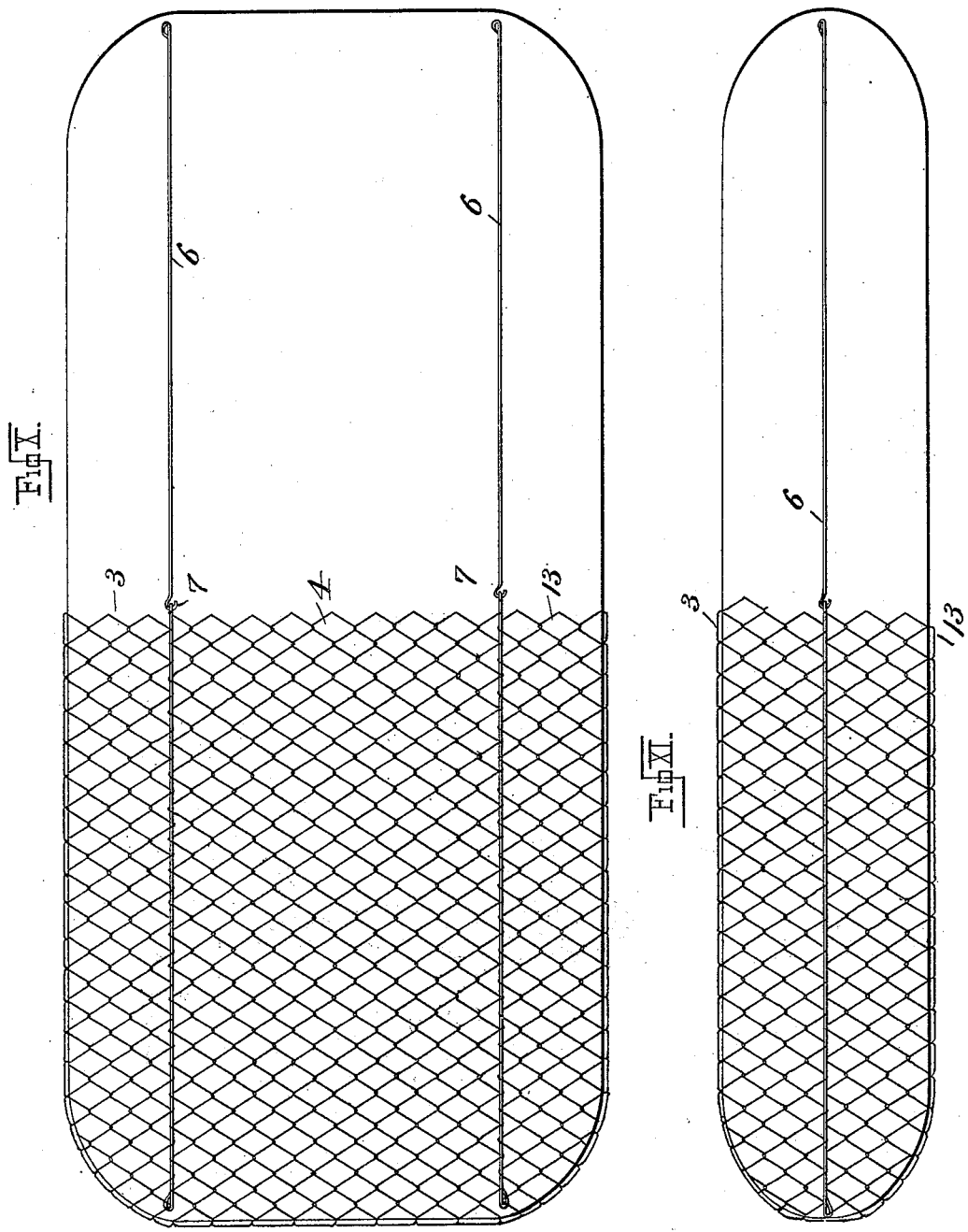

UNITED STATES PATENT OFFICE.

CHARLES E. MALLETT, OF NEW YORK, N. Y.

BALE-COVERING.

SPECIFICATION forming part of Letters Patent No. 518,820, dated April 24, 1894.

Application filed January 30, 1894. Serial No. 498,457. (No model.)

*To all whom it may concern:*

Be it known that I, CHARLES E. MALLETT, a citizen of the United States, residing in the city, county, and State of New York, have invented certain new and useful Improvements in Bale-Coverings, of which the following is a specification.

When a cotton bale is to be covered with a wrapper or envelope of fireproof and waterproof material, it has been suggested that to protect such material from destruction—as, for example, from the tearing incident to handling the bales with hooks—an outer wrapping of wire-cloth be employed, which would, more effectually than the usual bands, afford an even support all over the bale surface to the waterproof envelope. But such a method of covering bales has never, so far as I know, gone into practical use—owing, as I believe, to the adoption by the inventors of imperfect means for carrying out the method. It has been suggested that ordinary wire fabric be used, but I have found by experiment that such fabric is too fragile, too extensible under strain, or too stiff and unyielding and too expensive for use. When the covering is fastened by loose projecting ends of such fabric—or by lacing—the fastening is found to be insecure, uneven in strain, apt to pull apart or break the meshes and difficult and slow of application.

My invention consists in a bale covering constructed substantially as hereinafter described and pointed out in the claim.

Referring to the accompanying drawings which form a part of this specification:—Figure I is an elevation of a piece of the fabric which is employed by me. Fig. II is a sectional view thereof, the line of section being indicated at II, II Fig. I. Fig. III is a top view of the top and side pieces of the covering. Fig. IV is a sectional view of a country press with bale and covering therein. Figs. V and VI are end and sectional views of a country bale to which the covering is applied. Fig. VII is a side view of the compress with a bale therein. Fig. VIII is an end view of the compressed bale. Fig. IX is a view of a spring clamp detached. Figs. X and XI are side views of the country and compress bales respectively.

For clearness, part of the fabric only is shown.

I employ a flexible wire fabric 1 (Fig. I) in which each strand 2 is bent around the neighboring strands so as to form a diamond shaped mesh. The angle of the strands in intertwining is so rounded that a fabric of some thickness is obtained, each strand forming alternately the upper and then the lower member as shown in Fig. II. Such a fabric when applied to a bale will maintain the cotton at a considerable height above moisture on the dock or landing where the cotton is handled and besides presents a surface of such roughness that bales may be piled on top of each other without danger of one sliding on the other and toppling the pile over, as is the case with bales covered with ordinary smooth wire fabric. This fabric I prepare in the form shown in Fig. III that is to say: I provide a top piece 3, somewhat larger than the top of the bale and an equal sized bottom piece (not shown in this figure). To the top piece 3, I attach two somewhat longer side pieces 4, 4. It will be seen that the form of fabric which I employ presents along the side a series of rounded wavy projections 5 and that such projections on the top and side pieces, overlapping, may be joined by a rod or rods 6 which pass through from end to end. Preferably the rod 6 is divided at the middle and is there united by a hook and eye as shown at 7.

Fig. IV shows the application of this cover to the country bale 8 in an ordinary country press 9. Usually the bale is to receive also a cover 10 of waterproof and fireproof material. The bottom piece 13 of wire fabric is placed under the bale and its ends hang down freely so as not to interfere with the operation of the press. The top and sides 3, 4 of the wire-fabric, are united as shown in Fig. III and placed on top of the bale, the projecting edges of the top piece 3 and the whole of the side pieces 4 dropping readily into compact piles on top of the follower 12 of the press as shown in Fig. IV. When the bale is pressed and the sides 14 of the press are opened, the side and top pieces of the covering are pulled or dropped down, the bottom edges of the side pieces 4 going down into juxtaposition with the then upturned edges of the bottom piece 13. Then rods 6 are run through these meeting edges of fabric, the ends of the side pieces are united to each other and to the top and bottom pieces by the short rods 15 (Fig. V) or by clamps 16, one of which is shown separately in Fig. IX. The ordinary country press is inadequate for imparting such pressure to the bale as to bring it into small enough compress for shipment to a distance and it is customary to submit the so-called "country bale" to heavy pressure in a "compress" greatly reducing its height so that the side-pieces 4 are no longer required on the compressed bale. When this country bale is put in the compress, the initial downward movement of the follower, loosens the fastenings so that they may be quickly removed, and when the bale has reached the compressed state, and the side pieces have been taken off, it is ready to have the rods 6 and 15 again run into place to unite the top and bottom pieces of the cover direct, as shown in Figs. VII, VIII and XI. The operation is quickly performed and results in a thoroughly protected bale. The fabric used will not stretch under strain; it closely follows the contour of the bale; it supports the bale above moisture; it facilitates sampling (for one mesh can be cut and turned back to permit the cotton to be withdrawn and can then be readily repaired with the spring clamps.) A fabric of this sort presents on all four sides a smooth selvage which will not unravel, presenting nowhere the sharp wire ends which project on ordinary wire cloth after the same is cut to fit a bale.

Having thus described my invention, the following is what I claim as new therein and desire to secure by Letters Patent:

A bale covering composed of sections of flexible open mesh wire cloth having wavy side edges forming loops, the loops of adjoining sections intermeshing when said sections are placed in position about a bale, and removable tie-rods adapted to be inserted alternately through the loop openings or meshing edges of said sections, substantially as shown and described.

CHAS. E. MALLETT.

Witnesses:
HARRY E. KNIGHT,
M. V. BIDGOOD.